US009321905B2

(12) United States Patent
Bouvy et al.

(10) Patent No.: US 9,321,905 B2
(45) Date of Patent: *Apr. 26, 2016

(54) NANOCOMPOSITE

(71) Applicant: TOTAL RESEARCH & TECHNOLOGY FELUY, Seneffe (BE)

(72) Inventors: Claire Bouvy, Bouge (BE); Olivier Lhost, Havre (BE); Marc Dupire, Hyon (BE); Pascal Navez, Fontaine L'Eveque (BE); Joseph DelHalle, Noville-les-bois (Fernelemont) (BE); Zineb Mekhalif, Namur (BE); Simon Detriche, Bolinne-Harlue (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/350,492

(22) PCT Filed: Oct. 15, 2012

(86) PCT No.: PCT/EP2012/070415
§ 371 (c)(1),
(2) Date: Apr. 8, 2014

(87) PCT Pub. No.: WO2013/053944
PCT Pub. Date: Apr. 18, 2013

(65) Prior Publication Data
US 2014/0323649 A1 Oct. 30, 2014

(30) Foreign Application Priority Data

Oct. 13, 2011 (EP) .................................... 11185106

(51) Int. Cl.
C08L 23/12 (2006.01)
C08K 3/04 (2006.01)
(Continued)

(52) U.S. Cl.
CPC . *C08K 7/24* (2013.01); *C08L 23/02* (2013.01); *C08L 23/04* (2013.01); *B82Y 30/00* (2013.01); *C08K 2201/011* (2013.01); *C08L 2314/02* (2013.01); *C08L 2314/06* (2013.01)

(58) Field of Classification Search
CPC ............................ C08K 7/24; C08K 2201/011
USPC .................. 524/586, 443, 584, 528; 977/742; 252/587
See application file for complete search history.

(56) References Cited

U.S. PATENT DOCUMENTS 6,864,207 B2 3/2005 Knoeppel et al.
6,930,071 B2 8/2005 Knoeppel et al.
(Continued)

FOREIGN PATENT DOCUMENTS

WO 2011/107495 A1 9/2011
WO 2011/160828 A1 12/2011

OTHER PUBLICATIONS

International Search Report issued in PCT/EP2012/070415 dated Jan. 14, 2013 (2 pages).
(Continued)

Primary Examiner — Robert Harlan
(74) Attorney, Agent, or Firm — Albert Shung

(57) ABSTRACT

A nanocomposite can include a polyolefin composition having at least one polyolefin. The polyolefin composition can have a multimodal molecular weight distribution, such as a bimodal molecular weight distribution. The nanocomposite can also include at least 0.001% by weight of nanoparticles, relative to a total weight of the nanocomposite. The nanoparticles can be carbon nanoparticles, silicon nanoparticles, or SiC nanoparticles. The nanocomposite can be prepared by providing the polyolefin composition, providing the nanoparticles, and blending the nanoparticles with the polyolefin composition. Formed articles can include the nanocomposite.

32 Claims, 4 Drawing Sheets

(51) Int. Cl.
    *C08K 7/24*      (2006.01)
    *C08L 23/02*     (2006.01)
    *C08L 23/04*     (2006.01)
    *B82Y 30/00*     (2011.01)

(56) References Cited

U.S. PATENT DOCUMENTS

| | | | |
|---|---|---|---|
| 7,127,853 B2* | 10/2006 | Miserque | C08F 210/16 |
| | | | 52/191 |
| 2011/0269863 A1* | 11/2011 | Kunst et al. | 521/172 |
| 2011/0301294 A1* | 12/2011 | Petrovic et al. | 525/185 |
| 2013/0197122 A1* | 8/2013 | Gauchet | B82Y 30/00 |
| | | | 522/157 |
| 2014/0264201 A1* | 9/2014 | Bouvy et al. | 252/587 |

OTHER PUBLICATIONS

Plastics Additives Handbook, ed. H. Zweifel, 5th edition, 2001, Hanser Publishers.
Office Action issued in Chinese Application No. 201280061556.0, dated Apr. 3, 2015, 21 pages.
Li Yufang, "Production Technologies and Market Prospect of Bimodal Polyethylene", Plastics Manufacture, No. 149, pp. 59-65, published on Dec. 1, 2006.

* cited by examiner

NANOCOMPOSITE

CROSS REFERENCE TO RELATED APPLICATIONS

This application claims the benefit of PCT/EP2012/070415, filed on Oct. 15, 2012, which claims priority from European Application No. 11185106.9, filed on Oct. 13, 2011.

FIELD OF THE INVENTION

The present invention relates to a nanocomposite comprising nanoparticles. The present invention also relates to a process for the preparation of said nanocomposite.

BACKGROUND OF THE INVENTION

Nanoparticles offer interesting and frequently unexpected properties because their properties are rather the result of the surface of the particles than of the bulk volume. For example, nanoparticles can show surprising mechanical, optical and electrical properties, even at low concentrations. The properties of nanoparticles have attracted interest in polymer science, particularly for polymer reinforcement. Particular attention has been focused on carbon nanotubes (CNTs).

An important factor in polymer reinforcement is the nanoparticles' distribution in the polymer. It is believed that the nanoparticles, and in particular carbon nanotubes, should ideally be uniformly distributed in the polymer and each nanoparticle individually coated with the polymer so that an efficient load transfer to the nanoparticles can be achieved. Lack of homogeneity, i.e. uneven distribution of the nanoparticles, may create weak spots and an uneven distribution of stress, in consequence leading at best to only marginal increases in mechanical properties.

Due to difficulties in dispersion, the hopes of drastically improving the polymer's mechanical properties by the incorporation of nanoparticles have not yet been fulfilled. Hence, the need to improve the distribution of nanoparticles in polymers remains. Several processes are presented in the literature to obtain a good dispersion of CNTs in polymers, and polyolefins in particular, such as in-situ polymerization and use of a compatibilizer.

In-situ polymerization: in this approach, the CNTs are used as catalyst support, replacing more classical supports like silica or alumina phosphate. After impregnation or deposit of the catalyst on the CNT—support, the supported catalyst can then be introduced in a polymerization reactor. At the end of the polymerization, catalyst residues (containing the CNTs) can be well dispersed in the polymer matrix. A main drawback of this approach is the need to introduce the CNT—supported catalyst in an industrial polymerization reactor. Indeed, at the end of the CNT—polyolefin production, a complete cleaning of the reactor may be required. Such cleaning can be severe for safety reasons (due to the uncertainties on the CNT toxicity, there should be no contamination of the CNTs in the next polyolefin production) and for product quality reasons (any remaining traces of CNT in the reactor could induce a significant color change of the polymer prepared in the next run).

Use of a compatibilizer: numerous products are known to be interesting compatibilizers for CNT—polymer blends. Unfortunately, effective compatibilizers can correspond to quite expensive products. The final cost of the CNT/compatibilizer/polymer can be significantly increased due to the presence of such a compatibilizer.

There remains a need to provide nanocomposites with improved dispersion of the nanoparticles. There also remains a need to provide processes to obtain nanocomposites with improved dispersion of the nanoparticles.

SUMMARY OF THE INVENTION

It is therefore an object of the present invention to provide a nanocomposite with an improved and/or more stable dispersion of nanoparticles. It is also an object of the present invention to provide a process for preparing a nanocomposite with an improved and/or more stable dispersion of nanoparticles.

The inventors have now discovered that these objects can be met either individually or in any combination by the present nanocomposite and the process for their production. The inventors have surprisingly found that by selecting the appropriate polyolefin, good nanoparticle dispersion can be easily achieved using standard extrusion processes.

According to a first aspect, the invention provides a nanocomposite, comprising:
  a polyolefin composition comprising at least one polyolefin; and
  at least 0.001% by weight of nanoparticles, relative to the total weight of the nanocomposite;
wherein the polyolefin composition has a multimodal molecular weight distribution, preferably a bimodal molecular weight distribution.

Preferably, the present invention provides a nanocomposite, comprising:
  a polyolefin composition comprising at least one polyolefin; and
  at least 0.001% by weight of nanoparticles, relative to the total weight of the nanocomposite, wherein the nanoparticles are selected from carbon nanoparticles, silicon nanoparticles, or SiC nanoparticles;
wherein the polyolefin composition has a multimodal molecular weight distribution, preferably a bimodal molecular weight distribution.

According to a second aspect, the invention provides formed articles comprising the nanocomposite according to the first aspect of the invention.

According to a third aspect, the invention encompasses a process for preparing the nanocomposite according to the first aspect of the invention, comprising the steps of:
(a) providing a polyolefin composition, wherein the polyolefin composition has a multimodal molecular weight distribution, preferably a bimodal molecular weight distribution;
(b) providing at least 0.001% by weight of nanoparticles, relative to the total weight of the nanocomposite; and
(c) blending the provided nanoparticles with the provided polyolefin composition to obtain the nanocomposite according to the first aspect of the invention.

Preferably, the present invention encompasses a process for preparing the nanocomposite, comprising the steps of:
(a) providing a polyolefin composition, wherein the polyolefin composition has a multimodal molecular weight distribution, preferably a bimodal molecular weight distribution;
(b) providing at least 0.001% by weight of nanoparticles, relative to the total weight of the nanocomposite, wherein the nanoparticles are selected from carbon nanoparticles, silicon nanoparticles, or SiC nanoparticles; and
(c) blending the provided nanoparticles with the provided polyolefin composition to obtain the nanocomposite according to the first aspect of the invention.

The independent and dependent claims set out particular and preferred features of the invention. Features from the dependent claims may be combined with features of the independent or other dependent claims as appropriate.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Figure 1:
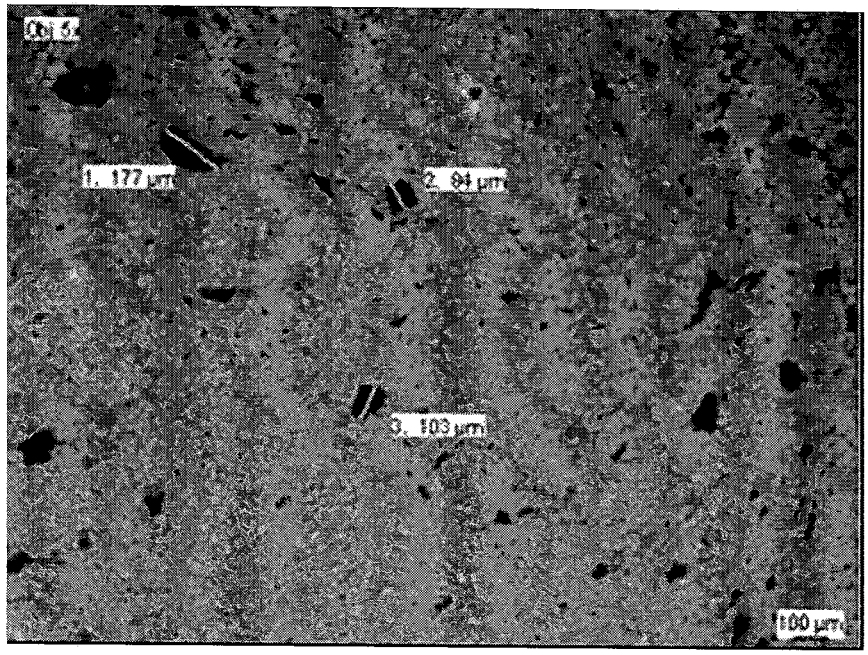
FIG. 1 represents a photograph showing a nanocomposite comprising 1% by weight of carbon nanotubes and monomodal polyethylene prepared in the presence of a Cr catalyst (polyolefin composition 1).

Before the present nanocomposites of the invention are described, it is to be understood that this invention is not limited to particular nanocomposites described, since such nanocomposites may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise. By way of example, "a nanoparticle" means one nanoparticle or more than one nanoparticle.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

According to a first aspect, the invention provides a nanocomposite, comprising at least 0.001% by weight of nanoparticles, relative to the total weight of the nanocomposite and at least one polyolefin composition; wherein the polyolefin composition has a multimodal molecular weight distribution, preferably a bimodal molecular weight distribution. In a preferred embodiment, the nanoparticles are selected from carbon nanoparticles, silicon nanoparticles, or SiC nanoparticles. In an embodiment, the nanoparticles are carbon nanoparticles. In an embodiment, the nanoparticles are silicon nanoparticles. In an embodiment, the nanoparticles are SiC nanoparticles. Preferably, the nanocomposite comprises at least 0.001% by weight of nanoparticles relative to the total weight of the nanocomposite, and a composition comprising at least one polyolefin; wherein the polyolefin has a multimodal molecular weight distribution, preferably a bimodal molecular weight distribution. In some embodiments, the invention encompasses a nanocomposite consisting of a polyolefin composition; and at least 0.001% by weight of nanoparticles, relative to the total weight of the nanocomposite; wherein the polyolefin composition has a multimodal molecular weight distribution, preferably a bimodal molecular weight distribution. In some embodiments, the invention encompasses a nanocomposite consisting of a polyolefin composition; and at least 0.001% by weight of nanoparticles, relative to the total weight of the nanocomposite; wherein the nanoparticles are selected from carbon nanoparticles, silicon nanoparticles, or SiC nanoparticles, and wherein the polyolefin composition has a multimodal molecular weight distribution, preferably a bimodal molecular weight distribution. It is to be understood that in this embodiment the weight percentages of all components of the nanocomposite add up to 100%.

As used herein, the term "nanocomposite" is used to denote a blend of nanoparticles and one or more polymers, particularly one or more polyolefins. Suitable blends for the nanocomposite according to the invention may be physical blends or chemical blends.

The nanocomposite according to the invention comprises at least one polyolefin composition.

The polyolefin composition according to the invention comprises one or more polyolefins. As used herein, the terms "olefin polymer" and "polyolefin" are used interchangeably.

In an embodiment of the invention, the nanocomposite comprises at least 50% by weight of polyolefin based on the total weight of the nanocomposite. In a preferred embodiment of the invention, the nanocomposite comprises at least 80% by weight of polyolefin based on the total weight of the nanocomposite. In a more preferred embodiment of the invention, the nanocomposite comprises at least 90% by weight of polyolefin based on the total weight of the nanocomposite.

The polyolefins used in the present invention may be any olefin homopolymer or any copolymer of an olefin and one or more comonomers. The polyolefins may be atactic, syndiotactic or isotactic. The olefin can for example be ethylene, propylene, 1-butene, 1-pentene, 1-hexene, 4-methyl-1-pentene or 1-octene, but also cycloolefins such as for example cyclopentene, cyclohexene, cyclooctene or norbornene. The comonomer is different from the olefin and chosen such that it is suited for copolymerization with the olefin. The comonomer may also be an olefin as defined above. Further examples of suitable comonomers are vinyl acetate ($H_3C-C(=O)O-CH=CH_2$) or vinyl alcohol ("$HO-CH=CH_2$", which as such is not stable and tends to polymerize). Examples of olefin copolymers suited for use in the present invention are random copolymers of propylene and ethylene, random copolymers of propylene and 1-butene, heterophasic copolymers of propylene and ethylene, ethylene-butene copolymers, ethylene-hexene copolymers, ethylene-octene copolymers, copolymers of ethylene and vinyl acetate (EVA), copolymers of ethylene and vinyl alcohol (EVOH).

Most preferred polyolefins for use in the present invention are olefin homopolymers and copolymers of an olefin and one or more comonomers, wherein said olefin and said one or more comonomer is different, and wherein said olefin is ethylene or propylene. The term "comonomer" refers to olefin comonomers which are suitable for being polymerized with olefin monomers, preferably ethylene or propylene monomers. Comonomers may comprise but are not limited to aliphatic $C_2$-$C_{20}$ alpha-olefins. Examples of suitable aliphatic $C_2$-$C_{20}$ alpha-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In an embodiment, the comonomer is vinyl acetate.

As used herein, the term "co-polymer" refers to a polymer, which is made by linking two different types of monomers in the same polymer chain. As used herein, the term "homopolymer" refers to a polymer which is made by linking olefin (preferably ethylene) monomers, in the absence of comonomers. The amount of comonomer can be from 0 to 12% by weight, based on the weight of the polyolefin, more preferably it can be from 0 to 9% by weight and most preferably it can be from 0 to 7% by weight. A copolymer can be a random or block (heterophasic) copolymer. Preferably, the copolymer is a random copolymer. Such olefin homopolymer and copolymers of an olefin and one or more comonomers are non-polar polymers. Preferred polyolefins for use in the present invention are propylene and ethylene polymers. Preferably, the polyolefin is selected from polyethylene and polypropylene homo- and copolymers. Preferably, the polyolefin is polyethylene or polypropylene, or a copolymer thereof. Preferably, the polyolefin is polyethylene.

In a preferred embodiment of the invention, the polyolefin composition comprises at least 50% by weight of polyolefin, relative to the total weight of the polyolefin composition. Preferably, the polyolefin composition comprises at least 60% by weight of polyolefin, preferably at least 70% by weight of polyolefin, preferably at least 80% by weight of polyolefin, preferably at least 90% by weight of polyolefin, preferably at least 95% by weight of polyolefin, preferably at least 99% by weight of polyolefin, relative to the total weight of the polyolefin composition. In a preferred embodiment of the invention, the polyolefin composition comprises at least 50% by weight of polyethylene, relative to the total weight of the polyolefin composition. Preferably, the polyolefin composition comprises at least 60% by weight of polyethylene, preferably at least 70% by weight of polyethylene, preferably at least 80% by weight of polyethylene, preferably at least 90% by weight of polyethylene, for example at least 95% by weight of polyethylene, for example at least 99% by weight of polyethylene, relative to the total weight of the polyolefin composition.

The polyolefin composition may be viscous or fluid at a temperature of 190° C. The viscosity η of the polyolefin composition can be measured by Rheologic Dynamic Analysis at a frequency of 1 rad/s and a temperature of 190° C. It can be measured according to ASTM D4440 by using a rheologic dynamic analyzer (RDA) 700 from Rheometrics, a plate diameter of 25 mm and a gap between plates of 2 mm+/−0.2 mm. The rheological measurements were performed at 190° C. under nitrogen and at 10% of strain. Preferably, the viscosity is at least 10 000 Pa·s, preferably at least 20 000 Pa·s, preferably at least 40 000 Pa·s.

In a preferred embodiment, the High Load Melt Index (HLMI) of the polyolefin is at most 25 g/10 min, for example at most 20 g/10 min, for example at most 15 g/10 min, preferably at most 10 g/10 min, preferably at most 8 g/10 min, with the High Load Melt Index (HLMI) being measured by the procedure of ASTM D-1238 using a temperature of 190° C. and a load of 21.6 kg.

In a preferred embodiment, the High Load Melt Index (HLMI) of polyethylene is at most 25 g/10 min, for example at most 20 g/10 min, for example at most 15 g/10 min, preferably at most 10 g/10 min, preferably at most 8 g/10 min, with the High Load Melt Index (HLMI) being measured by the procedure of ISO 1133 condition G using a temperature of 190° C. and a load of 21.6 kg.

In an embodiment, the polyolefin has a density of from 0.900 to 0.960 g/cm³, preferably from 0.940 to 0.960 g/cm³, as determined with the ISO 1183 standard.

In a preferred embodiment of the invention, the polyolefin has a weight average molecular weight $M_w$ of at least 60 000 Da, preferably at least 100 000 Da, preferably at least 200 000 Da. Molecular weights can be determined by Size Exclusion Chromatography (SEC) as described herein below in the test methods.

In a preferred embodiment of the invention, the polyolefin has a polydispersity index of at least 8, preferably of at least 10, preferably of at least 15.

The polydispersity index is defined by the ration $M_w/M_n$ of the weight average molecular weight $M_w$ to the number average molecular weight $M_n$ as determined by Size Exclusion Chromatography (SEC) as described herein below in the test methods.

In a preferred embodiment of the invention, the polyolefin has a long chain branching index $g_{rheo}$ that is at least 0.65, preferably at least 0.80, preferably at least 0.90. As used herein the long chain branching (LCB) index $g_{rheo}$ can be obtained by rheology according to the formula $$g_{rheo}=1.1/(3.73+6.08*10^{-7}(M_w)^{2.5}+0.144/(\ln(\rho)))$$

wherein $M_w$ is the weight average molecular weight of the polyolefin expressed in kDa and ρ is the density of the polyolefin expressed in g/cm³.

The polyolefin composition according to the invention has a multimodal molecular weight distribution, preferably a bimodal molecular weight distribution.

As used herein, the term "monomodal polyolefins" or "polyolefins with a monomodal molecular weight distribution" refers to polyolefins having one maximum in their molecular weight distribution curve, which is also defined as a unimodal distribution curve. As used herein, the term "polyolefins with a bimodal molecular weight distribution" or "bimodal polyolefins" it is meant, polyolefins having a distribution curve being the sum of two unimodal molecular weight distribution curves. By the term "polyolefins with a multimodal molecular weight distribution" or "multimodal polyolefins" it is meant polyolefins with a distribution curve being the sum of at least two, preferably more than two unimodal distribution curves.

In an embodiment, the bimodal weight distribution comprises a low mass fraction of from 10 to 90% by weight and a high mass fraction which is comprised in such a way that the sum is 100% by weight, with % by weight relative to the total weight of the polyolefin; preferably a low mass fraction of from 20 to 80% by weight, even more preferably from 30 to 70% by weight, most preferably from 40 to 60% by weight, and a high mass fraction which is comprised in such a way that the sum is 100% by weight, with % by weight relative to the total weight of the polyolefin. In an embodiment, the bimodal distribution has a unimodal molecular weight distribution having a weight average molecular weight of at most 50 kDa preferably at most 25 kDa, and has second unimodal molecular weight distribution having a weight average molecular weight of at least 50 kDa, preferably at least 100 kDa. In an embodiment, the polyolefin comprises a low mass fraction having a weight average molecular weight of at most 50 kDa, preferably at most 25 kDa, of from 10 to 90% by weight and a high mass fraction having a weight average molecular weight of at least 50 kDa, preferably at least 100 kDa, which is comprised in such a way that the sum is 100% by weight, with % by weight relative to the total weight of the polyolefin. In an embodiment, the polyolefin comprises 20 to 80% by weight, even more preferably from 30 to 70% by weight, most preferably from 40 to 60% by weight of a low mass fraction having a weight average molecular weight of at most 50 kDa, preferably at most 25 kDa, and a high mass fraction having a weight average molecular weight of at least 50 kDa, preferably at least 100 kDa, which is comprised in such a way that the sum is 100% by weight, with % by weight relative to the total weight of the polyolefin.

The bimodal or multimodal polyolefin composition may be a physical blend or a chemical blend of two or more monomodal polyolefins. Preferably, the polyolefin composition comprises a chemical blend of two or more monomodal polyolefins. Preferably, the polyolefin composition comprises a chemical blend of two monomodal polyolefins.

In a preferred embodiment, the polyolefin used in the polyolefin composition has a multimodal weight distribution; preferably the polyolefin used in the polyolefin composition has a bimodal weight distribution.

The polyolefin, such as polyethylene, can be prepared in the presence of any catalyst known in the art. As used herein, the term "catalyst" refers to a substance that causes a change in the rate of a polymerization reaction without itself being consumed in the reaction. In the present invention, it is especially applicable to catalysts suitable for the polymerization of ethylene to polyethylene. These catalysts will be referred to as ethylene polymerization catalysts or polymerization catalysts. In a preferred embodiment of the invention, the polyolefin composition comprises a polyolefin prepared in the presence of a catalyst selected from a Ziegler-Natta catalyst, a metallocene catalyst, or both; preferably prepared in the presence of a Ziegler-Natta catalyst.

The term "Ziegler-Natta catalyst" or "ZN catalyst" refers to catalysts having a general formula $M^1X_v$, wherein $M^1$ is a transition metal compound selected from group IV to VII from the periodic table of elements, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$ and $TiCl_4$. Suitable ZN catalysts for use in the invention are described in U.S. Pat. Nos. 6,930,071 and 6,864,207, which are incorporated herein by reference.

In some embodiments, the polyolefin is a polyolefin produced in the presence of small Ziegler-Natta catalyst particles. The polyolefin can be produced in the presence of a Ziegler-Natta catalyst with an average particle size (D50) of at most 15 μm, preferably at most 13 μm, preferably at most 10 μm, preferably at most 8 μm, for example at most 5 μm and preferably at least 3 μm. The D50 is defined as the particle size for which fifty percent by volume of the particles has a size lower than the D50. The D50 can be measured by laser diffraction analysis on a Malvern type analyzer after having put the catalyst in suspension in cyclohexane. Suitable Malvern systems include the Malvern 2000, Malvern 2600 and Malvern 3600 series. The Malvern MasterSizer may also be useful as it can more accurately measure the D50 towards the lower end of the range e.g. for average particle sizes of less 8 μm, by applying the theory of Mie, using appropriate optical means.

In a preferred embodiment, the polyolefin used in the polyolefin composition is a multimodal polyolefin prepared in the presence of a Ziegler-Natta catalyst. For example, the polyolefin can be a bimodal polyethylene prepared in the presence of a Ziegler-Natta catalyst.

The term "metallocene catalyst" is used herein to describe any transition metal complexes consisting of metal atoms bonded to one or more ligands. The metallocene catalysts are compounds of Group 4 transition metals of the Periodic Table such as titanium, zirconium, hafnium, etc., and have a coordinated structure with a metal compound and ligands composed of one or two groups of cyclo-pentadienyl, indenyl, fluorenyl or their derivatives. Use of metallocene catalysts in the polymerization of polyethylene has various advantages. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In an embodiment, the metallocene catalyst has a general formula (I) or (II):

$$(Ar)_2MQ_2 \qquad (I); or$$

$$R^1(Ar)_2MQ_2 \qquad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogens, a hydrosilyl, a $SiR^2_3$ group wherein $R^2$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogens; a hydrocarboxy having 1 to 20 carbon atoms; and a hydrocarbyl having 1 to 20 carbon atoms, wherein said hydrocarbyl optionally contains one or more atoms selected from the group comprising B, Si, S, O, F, Cl and P; and wherein $R^1$ is a divalent group or moiety bridging the two Ar groups and selected from the group consisting of a $C_1$-$C_{20}$ alkylene, a germanium, a silicon, a siloxane, an alkylphosphine and an amine, and wherein said $R^1$ is optionally substituted with one or more substituents each independently selected from the group consisting of halogens, a hydrosilyl, a $SiR^3_3$ group wherein $R^3$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

The term "hydrocarboxy having 1 to 20 carbon atoms" refers to a radical having the formula —O—$R_a$ wherein $R_a$ is hydrocarbyl having 1 to 20 carbon atoms. Preferred hydrocarboxy groups are alkoxy groups. The term "alkoxy" or "alkyloxy" as used herein refers to a radical having the formula —O—$R_b$ wherein $R_b$ is alkyl. Non-limiting examples of suitable alkoxy groups include methoxy, ethoxy, propoxy, isopropoxy, butoxy, isobutoxy, sec-butoxy, tert-butoxy, pentyloxy, amyloxy, hexyloxy, heptyloxy and octyloxy. Preferred hydrocarboxy groups are methoxy, ethoxy, propoxy, butoxy, and amyloxy.

As used herein, the term "alkyl" by itself or as part of another substituent, refers to a straight or branched saturated hydrocarbon radical group joined by single carbon-carbon bonds having 1 or more carbon atoms, for example 1 to 20 carbon atoms, for example 1 to 12 carbon atoms, for example 1 to 6 carbon atoms, for example 1 to 4 carbon atoms, for example 2 to 3 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of $C_{1-12}$alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

As used herein, the term "$C_{3-20}$cycloalkyl", by itself or as part of another substituent, refers to a saturated or partially saturated cyclic alkyl radical containing from 3 to 20 carbon atoms. Examples of $C_{3-20}$cycloalkyl include cyclopropyl, cyclobutyl, cyclopentyl, cyclohexyl, cycloheptyl and cyclooctyl.

As used herein, the term "$C_{6-20}$aryl", by itself or as part of another substituent, refers to a polyunsaturated, aromatic hydrocarbyl group having a single ring (i.e. phenyl) or multiple aromatic rings fused together (e.g. naphthalene), or linked covalently, typically containing 6 to 20 carbon atoms; wherein at least one ring is aromatic. Examples of $C_{6-20}$aryl include phenyl, naphthyl, indanyl, biphenyl, or 1,2,3,4-tetrahydro-naphthyl.

The term "arylalkyl", as a group or part of a group, refers to an alkyl as defined herein, wherein one or more hydrogen atoms are replaced by an aryl as defined herein. Examples of arylalkyl radicals include benzyl, phenethyl, dibenzylmethyl, methylphenylmethyl, 3-(2-naphthyl)-butyl, and the like.

As used herein, the term "alkylaryl", by itself or as part of another substituent, refers to an aryl group as defined herein, wherein one or more hydrogen atoms are replaced by an alkyl as defined herein.

Illustrative examples of metallocene catalysts comprise but are not limited to bis(cyclopentadienyl)zirconium dichloride ($Cp_2ZrCl_2$), bis(cyclopentadienyl)titanium dichloride ($Cp_2TiCl_2$), bis(cyclopentadienyl)hafnium dichloride ($Cp_2HfCl_2$); bis(tetrahydroindenyl)zirconium dichloride, bis(indenyl)zirconium dichloride, and bis(n-butyl-cyclopentadienyl)zirconium dichloride, ethylenebis(4,5,6,7-tetrahydro-1-indenyl)zirconium dichloride, ethylenebis(1-indenyl)zirconium dichloride, dimethylsilylene bis(2-methyl-4-phenyl-inden-1-yl)zirconium dichloride, diphenylmethylene (cyclopentadienyl)(fluoren-9-yl)zirconium dichloride, and dimethylmethylene [1-(4-tert-butyl-2-methyl-cyclopentadienyl)](fluoren-9-yl)zirconium dichloride.

The metallocene catalysts can be provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support. In an embodiment, the catalyst used for preparing the polyolefin is a supported metallocene-alumoxane catalyst comprising a metallocene and an alumoxane which are bound on a porous silica support.

In some embodiments, the polyolefin used in the polyolefin composition is a multimodal polyolefin prepared in the presence of a metallocene catalyst. For example, the polyolefin can be a bimodal polyethylene prepared in the presence of a metallocene catalyst.

The nanocomposite according to the invention comprises at least 0.001% by weight of nanoparticles, relative to the total weight of the nanocomposite. For example, the nanocomposite of the present invention can comprise at least 0.005% by weight, more preferably at least 0.01% by weight and most preferably at least 0.05% by weight, relative to the total weight of the nanocomposite, of nanoparticles. In some embodiments, the nanocomposite of the present invention can comprise at least 0.005% by weight of nanoparticles, more preferably at least 0.01% by weight and most preferably at least 0.05% by weight, relative to the total weight of the nanocomposite, wherein the nanoparticles are selected from carbon nanoparticles, silicon nanoparticles, or SiC nanoparticles, preferably carbon nanoparticles.

In some embodiments of the invention, the nanocomposite comprises from 0.001% to 25% by weight of nanoparticles, preferably from 0.002% to 20% by weight, preferably from 0.005% to 10% by weight, preferably from 0.01% to 5% by weight, relative to the total weight of the nanocomposite. In some embodiments, the nanocomposite comprises from 0.001% to 25% by weight of nanoparticles selected from carbon nanoparticles, silicon nanoparticles, or SiC nanoparticles, preferably from 0.002% to 20% by weight, preferably from 0.005% to 10% by weight, preferably from 0.01% to 5% by weight, relative to the total weight of the nanocomposite. In some embodiments of the invention, the nanocomposite comprises from 0.001% to 25% by weight of carbon nanoparticles, preferably from 0.002% to 20% by weight, preferably from 0.005% to 10% by weight, preferably from 0.01% to 5% by weight, relative to the total weight of the nanocomposite.

Preferably, the nanocomposite of the present invention comprises at most 20% by weight, more preferably at most 15% by weight, even more preferably at most 10% by weight, and most preferably at most 5% by weight, relative to the total weight of the nanocomposite, of nanoparticles. In some embodiments, the nanocomposite comprises at most 20% by weight, more preferably at most 15% by weight, even more preferably at most 10% by weight, and most preferably at most 5% by weight of nanoparticles, relative to the total weight of the nanocomposite, wherein the nanoparticles are selected from carbon nanoparticles, silicon nanoparticles, or SiC nanoparticles. In some embodiments, the nanocomposite comprises at most 20% by weight, more preferably at most 15% by weight, even more preferably at most 10% by weight, and most preferably at most 5% by weight of carbon nanoparticles relative to the total weight of the nanocomposite.

The nanoparticles used in the present invention can generally be characterized by having a size from 1 nm to 500 nm. In the case of, for example, nanotubes, this definition of size can be limited to two dimensions only, i.e. the third dimension may be outside of these limits. Preferably, the nanoparticles are selected from the group comprising: carbon nanoparticles, silicon nanoparticles, and SiC nanoparticles. In an embodiment, the nanoparticles are selected from the group comprising nanotubes, nanofibers, carbon black, nanographene, nanographite, and blends thereof. In an embodiment, the nanoparticles are selected from the group comprising carbon-, silicon- or SiC-nanotubes, -nanofibers, -nanographene, -nanographite, carbon black, and blends thereof. Preferably, the nanoparticles are selected from the group comprising nanotubes, nanofibers, carbon black, and blends of these. More preferred are nanotubes, nanofibers, and blends of these. Most preferred are nanotubes.

Suitable nanotubes to be used in the invention can be cylindrical in shape and structurally related to fullerenes, an example of which is Buckminster fullerene ($C_{60}$). Suitable nanotubes may be open or capped at their ends. The end cap may for example be a Buckminster-type fullerene hemisphere. The nanotubes made in the present invention may be made from elements of group 14 of the periodic table of the elements, such as carbon (carbon nanotubes or CNTs) or silicon (silicon nanotubes), or mixtures thereof, such as SiC nanotubes, or from a combination of elements of groups 13 and 15 of the periodic table of the elements (see International Union of Pure and Applied Chemistry (IUPAC) Periodic Table of the Elements), such as for example a combination of boron or aluminum with nitrogen or phosphorus. Suitable nanotubes may also be made from carbon and a combination of elements of groups 13, 14 and 15 of the periodic table of the elements. Suitable nanotubes may also be made from silicon and a combination of elements of groups 13, 14 and 15 of the periodic table of the elements. Alternatively, suitable nanotubes may also be selected from the group comprising tungsten disulfide nanotubes, titanium dioxide nanotubes, molybdenum disulfide nanotubes, copper nanotubes, bismuth nanotubes, cerium dioxide nanotubes, zinc oxide nanotubes, and mixtures thereof. In a preferred embodiment, the nanoparticles are selected from carbon nanotubes, silicon nanotubes, or SiC nanotubes.

Preferably the nanotubes used in the present invention are made from carbon, i.e. they comprise more than 90%, more preferably more than 95%, even more preferably more than 99% and most preferably more than 99.9% of their total weight in carbon; such nanotubes are generally referred to as "carbon nanotubes" (CNT). According to a preferred embodiment of the invention, the nanoparticles are carbon nanotubes. However, minor amounts of other atoms may also be present.

Suitable carbon nanotubes to be used in the present invention can be prepared by any method known in the art. They can be, prepared by the catalyst decomposition of hydrocarbons, a technique that is called Catalytic Carbon Vapor Deposition (CCVD). Other methods for preparing carbon nanotubes include the arc-discharge method, the plasma decomposition of hydrocarbons or the pyrolysis of selected polyolefin under selected oxidative conditions. The starting hydrocarbons can be acetylene, ethylene, butane, propane, ethane, methane or any other gaseous or volatile carbon-containing compound. The catalyst, if present, is used in either pure or in supported form. The presence of a support greatly improves the selectivity of the catalysts but it contaminates the carbon nanotubes with support particles, in addition to the soot and amorphous carbon prepared during pyrolysis. Purification can remove these by-products and impurities. This can be carried out according to the following two steps:
1) the dissolution of the support particles, typically carried out with an appropriate agent that depends upon the nature of the support and
2) the removal of the pyrolytic carbon component, typically based on either oxidation or reduction processes.

Nanotubes can exist as single-walled nanotubes (SWNT) and multi-walled nanotubes (MWNT), i.e. nanotubes having one single wall and nanotubes having more than one wall, respectively. In single-walled nanotubes a one atom thick sheet of atoms, for example a one atom thick sheet of graphite (also called graphene), is rolled seamlessly to form a cylinder. Multi-walled nanotubes consist of a number of such cylinders arranged concentrically. The arrangement in a multi-walled nanotube can be described by the so-called Russian doll model, wherein a larger doll opens to reveal a smaller doll.

In an embodiment, the nanoparticles are multi-walled carbon nanotubes, more preferably multi-walled carbon nanotubes having on average from 5 to 15 walls.

Nanotubes, irrespectively of whether they are single-walled or multi-walled, may be characterized by their outer diameter or by their length or by both.

Single-walled nanotubes are preferably characterized by an outer diameter of at least 0.5 nm, more preferably of at least 1.0 nm, and most preferably of at least 2.0 nm. Preferably their outer diameter is at most 50 nm, more preferably at most 30 nm and most preferably at most 10 nm. Preferably, the length of single-walled nanotubes is at least 0.1 µm, more preferably at least 1.0 µm, even more preferably at least 10 µm. Preferably, their length is at most 50 mm, more preferably at most 25 mm.

Multi-walled nanotubes are preferably characterized by an outer diameter of at least 1.0 nm, more preferably of at least 2.0 nm, 4.0 nm, 6.0 nm or 8.0 nm, and most preferably of at least 10.0 nm. The preferred outer diameter is at most 100 nm, more preferably at most 80 nm, 60 nm or 40 nm, and most preferably at most 20 nm. Most preferably, the outer diameter is in the range from 10.0 nm to 20 nm. The preferred length of the multi-walled nanotubes is at least 50 nm, more preferably at least 75 nm, and most preferably at least 100 nm. Their preferred length is at most 20 mm, more preferably at most 10 mm, 500 µm, 250 µm, 100 µm, 75 µm, 50 µm, 40 µm, 30 µm or 20 µm, and most preferably at most 10 µm. The most preferred length is in the range from 100 nm to 10 µm. In an embodiment, the multi-walled carbon nanotubes have an average outer diameter in the range from 10 nm to 20 nm or an average length in the range from 100 nm to 10 µm or both.

Non-limiting examples of commercially available multi-walled carbon nanotubes are Graphistrength™ 100, available from Arkema, and Nanocyl™ NC 7000, available from Nanocyl.

In an embodiment, the nanoparticles are nanofibers. Suitable nanofibers for use in the present invention preferably have a diameter of at least 1 nm, more preferably of at least 2 nm and most preferably of at least 5 nm. Preferably, their diameter is at most 500 nm, more preferably at most 300 nm, and most preferably at most 100 nm. Their length may vary from 10 µm to several centimeters.

Preferably, the nanofibers used in the present invention are carbon nanofibers, i.e. they comprise at least 50% by weight of carbon, relative to the total weight of the nanofiber. Preferably, suitable nanofibers used in the present invention comprise polyolefins, polyamides, polystyrenes, or polyesters as well as polyurethanes, polycarbonates, polyacrylonitrile, polyvinyl alcohol, polymethacrylate, polyethylene oxide, polyvinylchloride, or any blend thereof.

Suitable nanofibers for the present invention can be prepared by any suitable method, such as for example by drawing of a melt-spun or solution-spun fiber, by template synthesis, phase separation, self-assembly, electrospinning of a polyolefin solution or electrospinning of a polyolefin melt.

In an embodiment, the nanoparticles are carbon black particles. Carbon black is made of microcrystalline, finely dispersed carbon particles, which are obtained through incomplete combustion or thermal decomposition of liquid or gaseous hydrocarbons. Carbon black particles are characterized by a diameter in the range of from 5 nm to 500 nm, though they have a great tendency to form agglomerates. Carbon black comprises from 96% to 99% by weight of carbon, relative to its total weight, with the remainder being hydrogen, nitrogen, oxygen, sulfur or any combination of these. The surface properties of carbon black can be dominated by oxygen-comprising functional groups, such as hydroxyl, carboxyl or carbonyl groups, located on its surface.

In an embodiment, the nanoparticles are nanographene. Graphene in general, and including nanographene, may be a single sheet or a stack of several sheets having both micro- and nano-scale dimensions, such as in some embodiments an average particle size of 1 to 20 µm, specifically 1 to 15 µm, and an average thickness (smallest) dimension in nano-scale dimensions of less than or equal to 50 nm, specifically less than or equal to 25 nm, and more specifically less than or equal to 10 nm. An exemplary nanographene may have an average particle size of 1 to 5 µm, and specifically 2 to 4 µm. Graphene, including nanographene, may be prepared by exfoliation of nanographite or by a synthetic procedure by "unzipping" a nanotube to form a nanographene ribbon. Exfoliation to form graphene or nanographene may be carried out by exfoliation of a graphite source such as graphite, intercalated graphite, and nanographite. Exemplary exfoliation methods include, but are not limited to, those practiced in the art such as fluorination, acid intercalation, acid intercalation followed by thermal shock treatment, and the like, or a combination comprising at least one of the foregoing. Exfoliation of the nanographite provides a nanographene having fewer layers than non-exfoliated nanographite. It will be appreciated that exfoliation of nanographite may provide the nanographene as a single sheet only one molecule thick, or as a layered stack of relatively few sheets. In an embodiment, exfoliated nanographene has fewer than 50 single sheet layers, specifically fewer than 20 single sheet layers, specifically fewer than 10 single sheet layers, and more specifically fewer than 5 single sheet layers. In an embodiment, the nanographene has an aspect ratio in the range of greater than or equal to about 100:1, for example, greater than equal to about 1000:1. In an embodiment, the nanographene has a surface area greater than or equal to about 40 m²/gram nitrogen surface adsorption area. For example, the surface area is greater than or equal to about 100 m²/gram nitrogen surface adsorption area. In an embodiment, the nanographene is expanded.

In an embodiment, the nanoparticles are nanographite. The nanographite can be multilayered by furnace high temperature expansion from acid-treated natural graphite or microwave heating expansion from moisture saturated natural graphite. In an embodiment, the nanographite is a multi-layered nanographite which has at least one dimension with a thickness less than 100 nm. In some exemplary embodiments, the graphite may be mechanically treated such as by air jet milling to pulverize the nanographite particles. The pulverization of the particles ensures that the nanographite flake and other dimensions of the particles are less than 20 microns, most likely less than 5 microns.

The nanoparticles can form nanoparticle aggregates in the nanocomposite. Preferably, the size of each nanoparticle aggregate in the nanocomposite is at most 100 µm, preferably at most 75 µm, preferably at most 50 µm. In an embodiment, the size of each nanoparticle aggregate in the nanocomposite is at most 40 µm, preferably at most 30 µm, preferably at most 20 µm, preferably at most 10 µm.

The size of nanoparticles aggregates can be measured by transmission electron microscopy (TEM) or by optical microscopy, which allows visualization of isolated nanoparticles. Preferably, the composite material is cut in microtome sections, typically with a section width of from 0.05 to 100 µm, preferably from 50 to 100 µm, and investigated with a microtome. This allows evaluating the larger aggregates of CNT and gives an indication of their size.

In a preferred embodiment, the degree of dispersion of the nanoparticles in the polyolefin composition can be assessed by a method based on ISO 18553:2002. As part of said method based on ISO 18553:2002, the size of nanoparticle aggregates dispersed in the polyolefin composition can be determined.

The degree of dispersion of the nanoparticles in the polyolefin composition can be assessed using the (molar) absorptivity of the nanocomposite.

As used herein, the terms "molar absorption coefficient", "molar extinction coefficient", "molar absorptivity" and "absorptivity" are used interchangeably and refer to the measurement of how strongly a chemical species absorbs light at a given wavelength. Different disciplines have different conventions as to whether absorbance is Napierian or decadic, i.e., defined with respect to the transmission via natural or common logarithm. As used herein, the molar absorptivity is decadic.

The qualitative identification of a nanocomposite can be achieved by comparing the absorption spectrum of the nanocomposite with the spectra of known substances. A known substance can be determined by measuring the absorbance at one or more wavelengths and using the Beer-Lambert law and the molar absorptivity to calculate its amount concentration. Concentrations can also be determined from an analytical function or an analytical calibration curve.

According to an embodiment of the invention, the absorptivity E of the nanocomposite at a wavelength λ of 800 nm is at least 250 per cm thickness of the sample and per % by weight of nanoparticles, wherein % by weight is calculated relative to the total weight of the nanocomposite, wherein the absorptivity is calculated using the Lambert-Beer equation $A=lC\epsilon$, wherein A is the absorbance, l is the thickness of the sample in cm and C is the concentration of nanoparticles in % by weight, relative to the total weight of the nanocomposite. According to an embodiment of the invention, the difference in molar absorptivity Δε of the nanocomposite at a wavelength λ of 800 nm compared to the nanocomposite without nanoparticles is at least 75 per cm thickness of the sample and per % by weight of nanoparticles, wherein % by weight is calculated relative to the total weight of the nanocomposite, wherein the absorptivity is calculated using the Lambert-Beer equation $A=lC\epsilon$, wherein A is the absorbance, l is the thickness of the sample in cm and C is the concentration of nanoparticles in % by weight, relative to the total weight of the nanocomposite.

The method to measure the absorptivity of a nanocomposite can be performed as described herein below. A slice of the nanocomposite is cut up in a thin section, preferably with a thickness from 40 μm to 100 μm. The thin section is melted between two microscopic slides and then pressed under compression. The temperature is above the melting point of the nanocomposite, preferably between 200 and 250° C., preferably 220° C. The sample can be compressed manually. The thickness of the slice is measured. The slice is then put inside a spectrophotometer and a light beam with wavelength of 800 nm is sent on the sample. The absorbance is recorded and the (molar) absorptivity is calculated following the Lambert-Beer equation.

In an embodiment of the invention, the nanocomposite comprises one or more additives selected from the group comprising an antioxidant, an antiacid, a UV-absorber, an antistatic agent, a light stabilizing agent, an acid scavenger, a lubricant, a nucleating/clarifying agent, a colorant or a peroxide, and combinations thereof.

The invention also encompasses the nanocomposite as described herein wherein the nanocomposite comprises from 0% to 10% by weight of at least one additive, based on the total weight of the nanocomposite. In a preferred embodiment, said nanocomposite comprises less than 5% by weight of additive, based on the total weight of the nanocomposite, for example from 0.1 to 3% by weight of additive, based on the total weight of the nanocomposite.

In a preferred embodiment, the nanocomposite comprises an antioxidant. Suitable antioxidants include, for example, phenolic antioxidants such as pentaerythritol tetrakis[3-(3', 5'-di-tert-butyl-4'-hydroxyphenyl)propionate] (herein referred to as Irganox 1010), tris(2,4-ditert-butylphenyl) phosphite (herein referred to as Irgafos 168), 3DL-alpha-tocopherol, 2,6-di-tert-butyl-4-methylphenol, dibutylhydroxyphenylpropionic acid stearyl ester, 3,5-di-tert-butyl-4-hydroxyhydrocinnamic acid, 2,2'-methylenebis(6-tert-butyl-4-methyl-phenol), hexamethylene bis[3-(3,5-di-tert-butyl-4-hydroxyphenyl)propionate], benzenepropanamide,N,N'-1,6-hexanediyl bis[3,5-bis(1,1-dimethylethyl)-4-hydroxy] (Antioxidant 1098), Diethyl 3,5-Di-Tert-Butyl-4-Hydroxybenzyl Phosphonate, Calcium bis[monoethyl(3,5-di-tert-butyl-4-hydroxylbenzyl)phosphonate], Triethylene glycol bis (3-tert-butyl-4-hydroxy-5-methylphenyl)propionate (Antioxidant 245), 6,6'-di-tert-butyl-4,4'-butylidenedi-m-cresol, 3,9-bis(2-(3-(3-tert-butyl-4-hydroxy-5-methylphenyl)propionyloxy-1,1-dimethylethyl)-2,4,8,10-tetraoxaspiro[5,5] undecane, 1,3,5-trimethyl-2,4,6-tris(3,5-di-tert-butyl-4-hydroxybenzyl)benzene, 1,1,3-tris(2-methyl-4-hydroxy-5-tert-butylphenyl)butane, (2,4,6-trioxo-1,3,5-triazine-1,3,5(2H, 4H,6H)-triyl)triethylene tris[3-(3,5-di-tert-butyl-4-hydroxyphenyl)propionate], tris(3,5-di-tert-butyl-4-hydroxybenzyl)isocyanurate, Tris(4-tert-butyl-3-hydroxy-2, 6-dimethylbenzyl)isocyanurate, ethylene bis[3,3-bis(3-tert-butyl-4-hydroxyphenyl)butyrate], and 2,6-bis[[3-(1,1-dimethylethyl)-2-hydroxy-5-methylphenyl]octahydro-4,7-methano-1H-indenyl]-4-methyl-phenol. Suitable antioxidants also include, for example, phenolic antioxidants with dual functionality such 4,4'-Thio-bis(6-tert-butyl-m-methyl phenol) (Antioxidant 300), 2,2'-Sulfanediylbis(6-tert-butyl-4-methylphenol) (Antioxidant 2246-S),2-Methyl-4,6-bis(octylsulfanylmethyl)phenol, thiodiethylene bis[3-(3,5-di-tert-butyl-4-hydroxyphenyl)propionate], 2,6-di-tert-butyl-4-(4,6-bis(octylthio)-1,3,5-triazin-2-ylamino)phenol, N-(4-hydroxyphenyl)stearamide, bis(1,2,2,6,6-pentamethyl-4-piperidyl) [[3,5-bis(1,1-dimethylethyl)-4-hydroxyphenyl] methyl]butylmalonate, 2,4-di-tert-butylphenyl 3,5-di-tert-butyl-4-hydroxybenzoate, hexadecyl 3,5-di-tert-butyl-4-hydroxy-benzoate, 2-(1,1-dimethylethyl)-6-[[3-(1,1-dimethylethyl)-2-hydroxy-5-methylphenyl]methyl]-4-methylphenyl acrylate, and Cas nr. 128961-68-2 (Sumilizer GS). Suitable antioxidants also include, for example, aminic antioxidants such as N-phenyl-2-naphthylamine, poly(1,2-dihydro-2,2,4-trimethyl-quinoline), N-isopropyl-N'-phenyl-p-phenylenediamine, N-Phenyl-1-naphthylamine, CAS nr. 68411-46-1 (Antioxidant 5057), and 4,4-bis(alpha,alpha-dimethylbenzyl)diphenylamine (Antioxidant KY 405). In a preferred embodiment, the antioxidant is selected from pentaerythritol tetrakis[3-(3',5'-di-tert-butyl-4'-hydroxyphenyl) propionate] (herein referred to as Irganox 1010), tris(2,4-ditert-butylphenyl)phosphite (herein referred to as Irgafos 168), or a mixture thereof.

According to a second aspect, the invention encompasses formed articles comprising the nanocomposite according to the first aspect of the invention. Due to the improved mechanical properties of the polyolefin in the nanocomposite it is suitable for a wide variety of applications. Preferred articles are fibers, films, sheets, containers, pipes, foams, rotomolded articles and injection molded articles. Most preferred articles are fibers.

The improved mechanical properties make the nanocomposite suitable for fiber applications. The nanocomposite can also be transformed into a film with improved printability, better surface tension, increased thermal and high frequency sealability, improved stiffness and enhanced breathability. The film also has good barrier properties against atmospheric gases, in particular oxygen and nitrogen. The nanocomposite can also be used to manufacture pouches, for example, for medical applications. The nanocomposite is also suitable for typical injection, extrusion and stretch blow molding applications, but also thermoforming, foaming and rotomolding. The articles made according to these processes can be mono- or multilayer, at least one of the layers comprising the nanocomposite of the invention.

According to a third aspect, the invention encompasses a process for preparing the nanocomposite according to the first aspect of the invention, comprising the steps of:
(a) providing a polyolefin composition, wherein the polyolefin composition has a multimodal molecular weight distribution, preferably a bimodal molecular weight distribution;

(b) providing at least 0.001% by weight of nanoparticles, relative to the total weight of the nanocomposite; and
(c) blending the nanoparticles with the polyolefin composition to obtain the nanocomposite according to the first aspect of the invention.

The nanoparticles and polyolefin composition can be as defined above. In a preferred embodiment, the nanoparticles are selected from carbon nanoparticles, silicon nanoparticles, or SiC nanoparticles In a preferred embodiment, the process comprises the steps of:
(a) providing a polyolefin composition, wherein the polyolefin composition has a multimodal molecular weight distribution, preferably a bimodal molecular weight distribution;
(b) providing at least 0.001% by weight of nanoparticles, relative to the total weight of the nanocomposite, wherein the nanoparticles are selected from carbon nanoparticles, silicon nanoparticles, or SiC nanoparticles; and
(c) blending the provided nanoparticles with the provided polyolefin composition to obtain the nanocomposite according to the first aspect of the invention.

In an embodiment, step (c) is performed in the absence of a solvent.

According to an embodiment, the invention provides a process for preparing a nanocomposite comprising a polyolefin composition, wherein the polyolefin composition has a multimodal molecular weight distribution, preferably a bimodal molecular weight distribution, and at least 0.001% by weight of nanoparticles, relative to the total weight of the nanocomposite, comprising the step of blending the nanoparticles with the polyolefin composition. In a preferred embodiment, the nanoparticles are selected from carbon nanoparticles, silicon nanoparticles, or SiC nanoparticles. In an embodiment, the blending is performed in the absence of a solvent.

The process of the present invention is particularly advantageous as it is simple and does not require additional compounds, such as for example compatibilizers. Hence, the process for preparing the nanocomposite of the present invention is preferably characterized by the absence of a compatibilizer. In other words, the preferred process for preparing the nanocomposite of the present invention is characterized by making no use of compatibilizers to homogeneously distribute the nanoparticles in the polyolefin composition.

Contrary to all expectations it has been found that the use of compatibilizers is not necessary to achieve a homogeneous dispersion of nanoparticles in a polyolefin composition as defined above. Surprisingly, the present process for preparing a nanocomposite of the present invention has given very good results for non-polar polymers such as polyolefins.

In a preferred embodiment of the invention, the polyolefin composition is in the form of a fluff, powder, or pellet, preferably in the form of a fluff.

As used herein, the term "fluff" refers to the polyolefin material that is prepared in a loop reactor with the hard catalyst particle at the core of each grain of the powder. As used herein the term "resin" encompasses both the fluff prepared in the loop reactor as well as the subsequently melted and/or pelleted polyolefin.

As used herein, the terms "polyolefin product" or "polyolefin pellet" are defined as polyolefin material that is prepared through compounding and homogenizing of the resin, for instance with mixing and/or extruder equipment. Preferably, the polyolefin particles have an average diameter (D50) of at most 2 mm, more preferably at most 1 mm, more preferably at most 100 µm. The D50 is defined as the particle size for which fifty percent by volume of the particles has a size lower than the D50. The average size of the particles is preferably assessed by particle sieving. Alternatively, the size may be measured by using optical measurements, preferably with a Camsizer.

As used herein, the term "polyolefin powder" refers to ground polyolefin fluff or ground polyolefin pellets.

Preferably, the nanocomposites are processed at a temperature above the melt temperature, i.e. they are melt-processed. In a preferred embodiment of the invention, the process of the present invention further comprises the step of:
(d) processing the nanocomposite obtained in step (c) at a temperature above the melt temperature of said nanocomposite;
wherein step (d) preferably comprises extruding a mixture of the polyolefin composition and the nanoparticles in an extruder.

The melt temperature of the nanocomposite can for example be determined by differential scanning calorimetry (DSC). The DSC can be performed with a Perkin-Elmer Pyris 1 equipment. In a typical DSC experiment, the sample is first heated up to 200° C. at a 20° C./min rate in order to fully melt the nanocomposite and remove its thermomechanical history. The sample is held at 200° C. during 3 min. Then the sample is cooled down to −40° C. at a 20° C./min rate and heated up again at 200° C. at 20° C./min. The melt temperature is measured during the second heating step and corresponds to the maximum of the melting peak. The standard used to calibrate the heating and cooling rate is Indium. It is noted that generally the melt temperature of the nanocomposite will be substantially the same as that of the polyolefin composition.

Said melt-processing step (d) can for example be a pelletization, i.e. the production of pellets by melt-extruding the nanocomposite, or step (d) can be a process selected from the group comprising fiber extrusion, film extrusion, sheet extrusion, pipe extrusion, blow molding, rotomolding, slush molding, injection molding, injection-stretch blow molding and extrusion-thermoforming. Most preferably, step (d) is a process selected from the group comprising pelletization, fiber extrusion, film extrusion, sheet extrusion and rotomolding.

The present invention preferably relates to extrusion. As used herein, the terms "extrusion" or "extrusion process", "pelletization" or "pelletizing" are used herein as synonyms and refer to the process of transforming polyolefin resin into a "polyolefin product" or into "pellets" after pelletizing. The process preferably comprises several equipments connected in series, including one or more rotating screws in an extruder, a die, and means for cutting the extruded filaments into pellets.

Preferably, polyolefin resin is fed to the extruding apparatus through a valve, preferably a feeding screw or a rotary valve, and conveyed—while passing a flow meter—to the at least one feeding zone of the extrusion apparatus. Preferably, nitrogen is provided in the feeding zone to prevent air from entering the extrusion apparatus, to thereby limit polyolefin degradation.

After being fed into the extruder, the polyolefin resin is preferably transported along with the rotating screw of the extruder. High shear forces are present in the extruder and product temperature increases. The polyolefin product, optionally in the presence of additives, melts and is homogenized and mixed.

The extruder can have one or more heating means e.g. a jacket to heat the extruder barrels or a hot oil unit. The screw in the extruder can be the vehicle upon which the polyolefin product travels. The shape of the screw can determine, along with the speed at which the screw turns, expressed in rpm, the speed at which the product moves and the pressure attained in the extruder. The screw in the screw mixer can be powered by a motor, preferably an electric motor.

In a preferred embodiment of the invention, the extruder has a screw speed from 10 to 2000 rpm, for example from 100 to 1000 rpm, for example from 150 to 300 rpm.

The melted and homogenized polyolefin product may further be pumped and pressurized by a pump at the end of the extruder, preferably powered by an electrical motor. Preferably, the melted polyolefin product is further filtered by means of a filter to remove impurities and to reduce the amount of gels. Preferably, the product is then pushed through a die, preferably a die plate, provided in a pelletizer. In an embodiment, the polyolefin comes out of the die plate as a large number of noodles which are then delivered into pellet cooling water and cut underwater in the pelletizer by rotating knives. The particles can be cooled down with the water and form the pellets which are transported to further processing sections, e.g. to a packaging section.

Preferably, the nanocomposites are processed at a temperature below the decomposition temperature of the nanocomposite. As used herein, the decomposition temperature of the nanocomposite is equal to the decomposition temperature as the polyolefin composition. In a preferred embodiment of the invention, the temperature is from 150° C. to 300° C., preferably from 200° C. to 250° C.

The nanocomposites of the invention are characterized by an excellent dispersion of the nanoparticles in the nanocomposites. The present inventors have shown that the present nanocomposites did not comprise nanoparticle aggregates above 100 µm. The nanocomposites of the invention can be easily produced under flexible processing conditions, while leading to homogeneous dispersion of the nanoparticles. The method provides advantages such as easy mixing and ease of processing.

The advantages of the present invention are illustrated by the following examples.

EXAMPLES

Test Methods

Determination of nanoparticles distribution can be performed by transmission electron microscopy (TEM): Nanocomposite samples were prepared under standard conditions. From these nanocomposite samples microtome slices having an average thickness of 130 nm were cut under cryogenic conditions. An area of ca. 1 mm by 1 mm was then checked optically for the presence of any agglomerated nanoparticles.

Distribution of nanoparticles in the nanocomposite was determined based on standard ISO 18553:2002. A slice of the nanocomposite was cut up after extrusion using a razor blade. The thin section was melted between two microscopic slides and then pressed under compression. The thickness of the slice was comprised between 40 µm and 100 µm, preferably 60 µm. An area of 5 mm by 5 mm was then checked optically for the presence of any agglomerated nanoparticles. The microscope used was a Leica DMLP, with a Leica 5× object if and a Leica DFC495 camera.

The density of the polyolefin compositions was measured by hydrostatic balance, according to ISO 1183.

For polyethylene, HLMI was determined using the procedure of ISO 1133 condition G with a temperature of 190° C. and a load of 21.6 kg.

For polyethylene, MI2 was determined using the procedure of ISO 1133 condition D with a temperature of 190° C. and a load of 2.16 kg.

For polypropylene, MI2 was determined using the procedure of ISO 1133 condition M with a temperature of 230° C. and a load of 2.16 kg.

The viscosity η of the polyolefin compositions was measured by Rheologic Dynamic Analysis at a frequency of 1 rad/s and a temperature of 190° C., according to ASTM D4440 by using a rheologic dynamic analyzer (RDA) 700 from Rheometrics, a plate diameter of 25 mm and a gap between plates of 2 mm+/−0.2 mm. The rheological measurements were performed at 190° C. under nitrogen and at 10% of strain.

Molecular weights (weight average and number average) are determined by Size Exclusion Chromatography (SEC) at high temperature (145° C.). A 10 mg polypropylene or polyethylene sample is dissolved at 160° C. in 10 ml of trichlorobenzene (technical grade) for 1 hour. Analytical conditions for the Alliance_GPCV 2000 from WATERS are:

Injection volume: +/−40411 µl
Automatic sample preparation and injector temperature: 160° C.
Column temperature: 145° C.
Detector temperature: 160° C.
Column set: 2 Shodex AT-806MS and 1 Styragel HT6E
Flow rate: 1 ml/min
Detector: Infrared detector (2800-3000 cm$^{-1}$)
Calibration: Narrow standards of polystyrene (commercially available)

The calculation for polypropylene was based on the Mark-Houwink relation ($\log_{10}(Mpp)=\log_{10}(M_{PS})-0.25323$); cut off on the low molecular weight end at $M_{PP}=1000$.

The calculation for polyethylene was based on the Mark-Houwink relation ($\log_{10}(M_{PE})=0.965909-\log_{10}(M_{PS})-0.28264$) (or $K_{PE}M^{(\alpha_{PE}+1)}=K_{PS}M^{(\alpha_{PS}+1)}$, with $K_{PS}=0.000167$, $K_{PE}=0.000525$, $\alpha_{PS}=0.7$ and $\alpha_{PE}=0.76$); cut off on the low molecular weight end at $M_{PE}=1000$.

The molecular weight distribution (MWD) (polydispersity) is then calculated as $M_w/M_n$.

Sample Preparation

All examples were conducted with multi-walled carbon nanotubes Nanocyl NC 7000, which have an apparent density of 50-150 kg/m³, a mean agglomerate size of 200-500 µm, a carbon content of more than 90% by weight, a mean number of 5-15 walls, an outer mean diameter of 10-15 nm and a length of 0.1-10 µm. All examples contain 1% by weight of carbon nanotubes, relative to the total weight of the nanocomposite.

The antioxidant mixture used in the examples consists of 2 parts of Irgafos 168 and 1 part of Irganox 1010.

All nanocomposites in the examples were formed by following procedure: 10 g of carbon nanotubes powder were weighted and added to 990 g of polyolefin fluff in a plastic bag. The carbon nanotubes and polyolefin fluff were physically mixed together in the plastic bag and 2500 ppm of the antioxidant mixture was added to the mixture. The mixture was then transferred inside a hopper and was melt-extruded using a Leistritz ZSE 18HPe twin-screw extruder (temperature=220° C., screw speed=200 rpm). At the exit of the extruder, the nanocomposite was cooled down to room temperature using a water bath and was finally cut into pellets using a Pell-Tec pelletizer.

Comparative Example 1

Polyolefin composition 1 contains a commercially available (from TOTAL PETROCHEMICALS) fluff of a monomodal polyethylene homopolymers prepared in the presence of a chromium catalyst having a high load melt flow index of 2.1 g/10 min, measured according to ISO 1133 at 190° C. and 21.6 kg. Polyolefin composition 1 has a density of 0.954 g/cm$^3$ determined according to ISO 1183, a viscosity q of 62900 Pa·s, a weight average molecular weight $M_w$ of 340 kDa and a molecular weight distribution MWD of 13.

FIG. 1 shows an optical microscopy view of a nanocomposite comprising polyolefin composition 1 and 1% by weight of carbon nanotubes as described above prepared using the procedure as described above. The largest nanoparticle aggregates have sizes of 84 μm, 103 μm and 177 μm.

Example 2

Polyolefin composition 2 contains a commercially available (from TOTAL PETROCHEMICALS) fluff of a bimodal polyethylene homopolymer prepared in the presence of a Ziegler-Natta catalyst having a high load melt flow index of 6 g/10 min, measured according to ISO 1133 at 190° C. and 21.6 kg. Polyolefin composition 2 has a density of 0.955 g/cm$^3$ determined according to ISO 1183, a viscosity η of 52500 Pa·s, a weight average molecular weight $M_w$ of 330 kDa and a molecular weight distribution MWD of 19.

Figure 2:
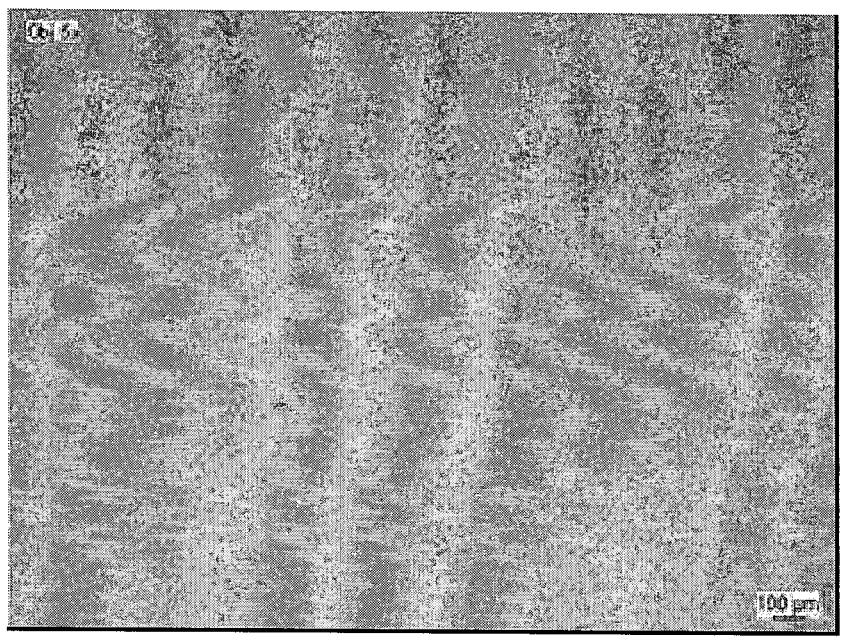
FIG. 2 represents a photograph showing a nanocomposite comprising 1% by weight of carbon nanotubes and bimodal polyethylene prepared in the presence of a ZN catalyst (polyolefin composition 2).

FIG. 2 shows an optical microscopy view of a nanocomposite comprising polyolefin composition 2 and 1% by weight of carbon nanotubes as described above prepared using the procedure as described above. The largest nanoparticle aggregates have sizes of at most 1 μm.

The dispersion of nanoparticles in example 2 (bimodal PE) is improved compared to comparative example 1 (monomodal PE). The size of nanoparticle aggregates is much smaller.

Comparative Example 3

Polyolefin composition 3 contains a commercially available (from TOTAL PETROCHEMICALS) fluff of a monomodal polyethylene homopolymer prepared in the presence of a chromium catalyst having a high load melt flow index of 51 g/10 min, measured according to ISO 1133 at 190° C. and 21.6 kg. Polyolefin composition 3 has a density of 0.962 g/cm$^3$ determined according to ISO 1183, a viscosity η of 8000 Pa·s, a weight average molecular weight $M_w$ of 110 kDa and a molecular weight distribution MWD of 8.

Figure 3:
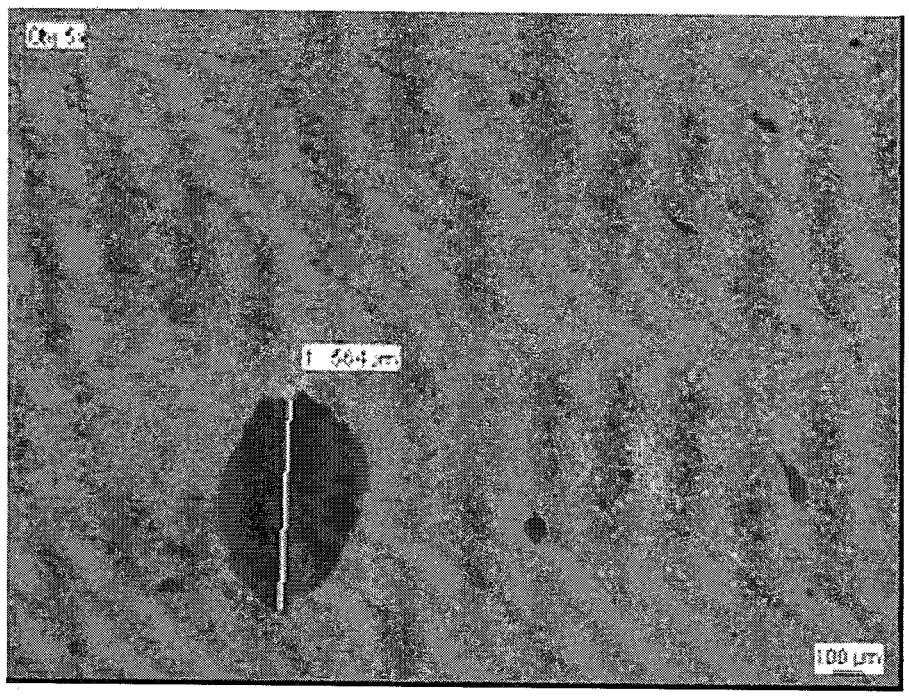
FIG. 3 represents a photograph showing a nanocomposite comprising 1% by weight of carbon nanotubes and monomodal polyethylene prepared in the presence of a Cr catalyst (polyolefin composition 3).

FIG. 3 shows an optical microscopy view of a nanocomposite comprising polyolefin composition 3 and 1% by weight of carbon nanotubes as described above prepared using the procedure as described above. The largest nanoparticle aggregate has a size of 564 μm.

Comparative Example 4

Polyolefin composition 4 contains a fluff of a monomodal polyethylene homopolymer prepared in the presence of a Ziegler-Natta catalyst having a melt flow index of 19 g/10 min, measured according to ISO 1133 at 190° C. and 2.16 kg. Polyolefin composition 4 has a density of 0.951 g/cm$^3$ determined according to ISO 1183, a viscosity η of 500 Pa·s, a weight average molecular weight $M_w$ of 50 kDa and a molecular weight distribution MWD of 4.

Figure 4:
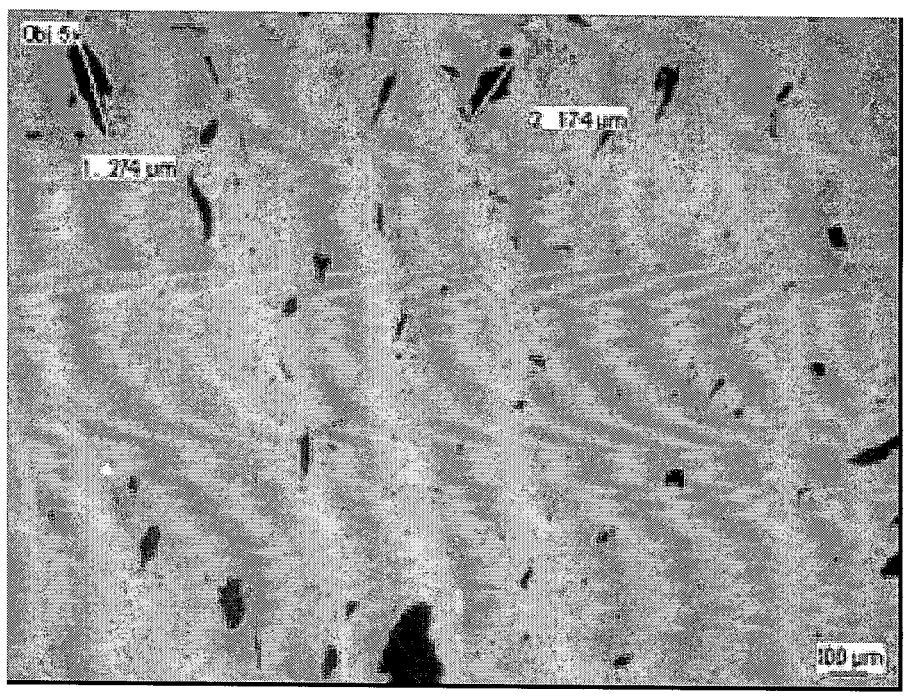
FIG. 4 represents a photograph showing a nanocomposite comprising 1% by weight of carbon nanotubes and monomodal polyethylene prepared in the presence of a ZN catalyst (polyolefin composition 4).

FIG. 4 shows an optical microscopy view of a nanocomposite comprising polyolefin composition 4 and 1% by weight of carbon nanotubes as described above prepared using the procedure as described above. The largest nanoparticle aggregates have sizes of 174 μm and 274 μm.

The dispersion of nanoparticles in example 2 (viscous PE) is improved compared to comparative example 4 (fluid PE). The size of nanoparticle aggregates is much smaller.

Example 5

Polyolefin composition 5 contains a fluff of a bimodal polyethylene homopolymer prepared in the presence of a metallocene catalyst having a high load melt flow index of 11 g/10 min, measured according to ISO 1133 at 190° C. and 21.6 kg. Polyolefin composition 5 has a density of 0.949 g/cm$^3$ determined according to ISO 1183, a viscosity η of 35000 Pa·s, a weight average molecular weight $M_w$ of 160 kDa and a molecular weight distribution MWD of 10.

Figure 5:
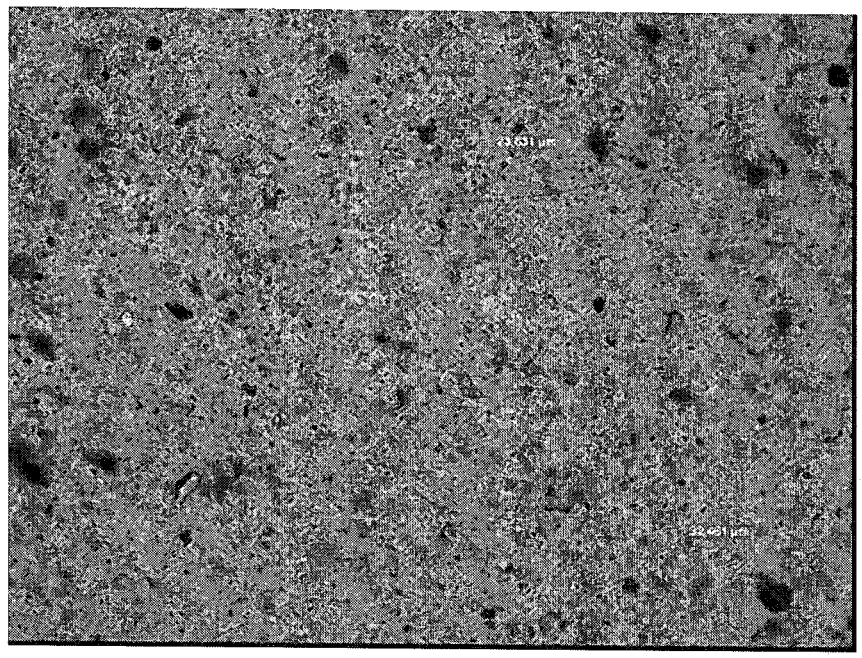
FIG. 5 represents a photograph showing a nanocomposite comprising 1% by weight of carbon nanotubes and bimodal polyethylene prepared in the presence of a metallocene catalyst (polyolefin composition 5).
Figure 6:
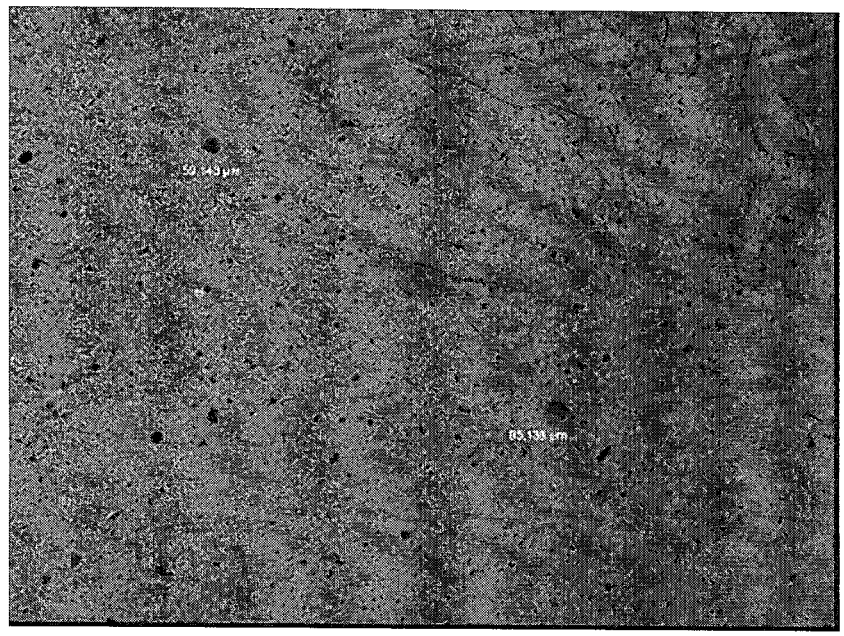
FIG. 6 represents a photograph showing a nanocomposite comprising 1% by weight of carbon nanotubes and bimodal polyethylene prepared in the presence of a metallocene catalyst (polyolefin composition 5).
Figure 7:
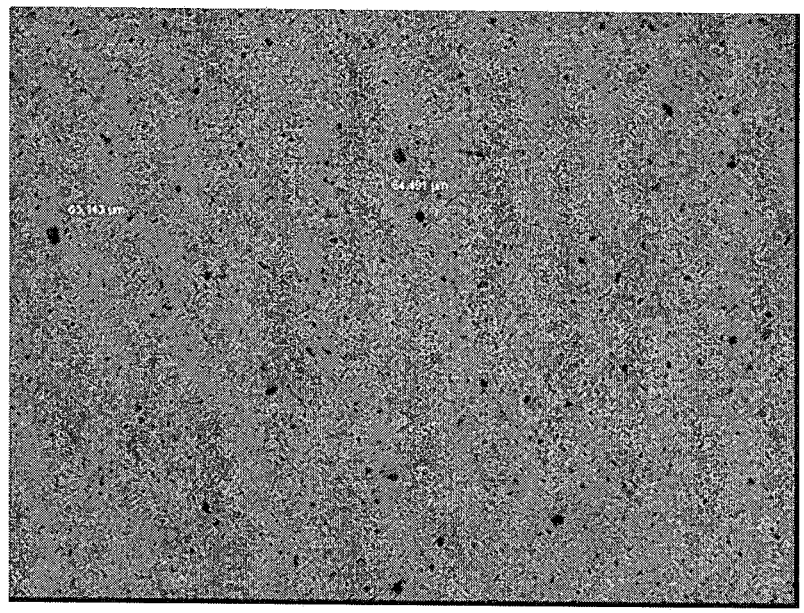
FIG. 7 represents a photograph showing a nanocomposite comprising 1% by weight of carbon nanotubes and bimodal polyethylene prepared in the presence of a metallocene catalyst (polyolefin composition 5).

FIGS. 5, 6 and 7 show an optical microscopy view of a nanocomposite comprising polyolefin composition 5 and 1% by weight of carbon nanotubes as described above prepared using the procedure as described above. The largest nanoparticle aggregates in FIG. 5 have sizes of 24 μm and 32 μm. The largest nanoparticle aggregates in FIG. 6 have sizes of 59 μm and 85 μm. The largest nanoparticle aggregates in FIG. 7 have sizes of 64 μm and 65 μm.

The dispersion of nanoparticles in FIGS. 5, 6 and 7 is improved compared to the comparative examples, but not as desirable as the dispersion of example 2.

Example 6

Various nanocomposites were prepared with polyolefin composition 2 described in example 2 and 1% by weight of carbon nanotubes as described above, using the procedure as described above, but with a varying screw speed to modify the degree of dispersion. The absorptivity E at a wavelength λ of 800 nm of polyolefin composition 2 without any carbon nanotubes was 175 per cm thickness of the sample and per % by weight of nanoparticles. A mediocre level of dispersion corresponded to an absorptivity ϵ of 209 per cm thickness of the sample and per % by weight of nanoparticles (a Δϵ of 34 per cm thickness of the sample and per % by weight of nanoparticles) at a wavelength λ of 800 nm. A good level of dispersion corresponded to an absorptivity E of 265 per cm thickness of the sample and per % by weight of nanoparticles (a Δϵ of 90 per cm thickness of the sample and per % by weight of nanoparticles) at a wavelength λ of 800 nm. An excellent level of dispersion corresponded to an absorptivity ϵ of 296 per cm thickness of the sample and per % by weight of nanoparticles (a Δϵ of 121 per cm thickness of the sample and per % by weight of nanoparticles) at a wavelength λ of 800 nm.

The results of the examples clearly show that the nanocomposite materials of the present invention show much improved homogeneity and dispersion when compared to the comparative examples.

The invention claimed is:

1. A nanocomposite comprising:
   a polyolefin composition comprising at least one polyolefin; and
   at least 0.001% by weight of nanoparticles, relative to a total weight of the nanocomposite, wherein the nanoparticles are selected from carbon nanoparticles, silicon nanoparticles, or SiC nanoparticles;
   wherein the polyolefin composition has a multimodal molecular weight distribution;
   wherein the nanocomposite comprises nanoparticle aggregates of the nanoparticles, wherein the nanoparticle aggregates have a size of at most 100 μm.

2. The nanocomposite according to claim 1, wherein the polyolefin composition has a bimodal molecular weight distribution.

3. The nanocomposite according to claim 1, wherein the absorptivity ϵ of the nanocomposite at a wavelength λ of 800 nm is at least 250 per cm thickness of the sample and per % by weight of nanoparticles, relative to the total weight of the nanocomposite, wherein the absorptivity is calculated using the Lambert-Beer equation A=1Cε, wherein A is the absorbance, 1 is the thickness of the sample in cm and C is the concentration of nanoparticles in % by weight, relative to the total weight of the nanocomposite.

4. The nanocomposite according to claim 1, wherein the nanoparticles are selected from the group consisting of nanotubes, nanofibers, carbon black, nanographene, nanographite, and blends thereof.

5. The nanocomposite according to claim 4, wherein the nanoparticles are nanotubes.

6. The nanocomposite according to claim 4, wherein the nanoparticles are selected from carbon nanotubes, silicon nanotubes, or SiC nanotubes.

7. The nanocomposite according to claim 1, wherein the polyolefin composition comprises at least 50% by weight of polyolefin, relative to the total weight of the polyolefin composition.

8. The nanocomposite according to claim 1, wherein the polyolefin is prepared in the presence of a catalyst selected from a Ziegler-Natta catalyst, a metallocene catalyst, or both.

9. The nanocomposite according to claim 8, wherein the catalyst is the Ziegler-Natta catalyst.

10. The nanocomposite according to claim 1, wherein the polyolefin has a High Load Melt Index (HLMI) of at most 25 g/10 min, wherein the HLMI is measured by the procedure of ASTM D-1238 using a temperature of 190° C. and a load of 21.6 kg.

11. The nanocomposite according to claim 1, wherein the polyolefin has a weight average molecular weight Mw of at least 60,000 Da.

12. The nanocomposite according to claim 11, wherein the polyolefin has a weight average molecular weight Mw of at least 100,000 Da.

13. The nanocomposite according to claim 11, wherein the polyolefin has a weight average molecular weight Mw of at least 200,000 Da.

14. The nanocomposite according to claim 1, wherein the polyolefin has a polydispersity index of at least 8.

15. The nanocomposite according to claim 14, wherein the polyolefin has a polydispersity index of at least 10.

16. The nanocomposite according to claim 14, wherein the polyolefin has a polydispersity index of at least 15.

17. The nanocomposite according to claim 1, wherein the polyolefin has a long chain branching index $g_{rheo}$ of at least 0.65 measured according to the formula $$g_{rheo}=1.1/(3.73+6.08*10^{-7}(M_w)^{2.5}+0.144/(\ln(\rho)))$$

wherein Mw is the weight average molecular weight of the polyolefin expressed in kDa and ρ is the density of the polyolefin expressed in g/cm³.

18. The nanocomposite according to claim 17, wherein the long chain branching index $g_{rheo}$ of the polyolefin is at least 0.80.

19. The nanocomposite according to claim 17, wherein the long chain branching index $g_{rheo}$ of the polyolefin is at least 0.90.

20. The nanocomposite according to claim 1, wherein the polyolefin is polyethylene.

21. A formed article comprising the nanocomposite of claim 1.

22. A process for preparing a nanocomposite comprising:
(a) providing a polyolefin composition comprising at least one polyolefin, wherein the polyolefin composition has a multimodal molecular weight distribution;
(b) providing at least 0.001% by weight of nanoparticles, relative to a total weight of the nanocomposite, wherein the nanoparticles are selected from carbon nanoparticles, silicon nanoparticles, or SiC nanoparticles; and
(c) blending the nanoparticles with the polyolefin composition to obtain the nanocomposite, wherein the nanoparticles form nanoparticle aggregates in the nanocomposite, and wherein the nanoparticle aggregates have a size of at most 100 μm.

23. The process according to claim 22, wherein the polyolefin composition has a bimodal molecular weight distribution.

24. The process according to claim 22, wherein the polyolefin composition is in the form of a fluff, powder, or pellet.

25. The process according to claim 22, wherein the polyolefin composition is in the form of a fluff.

26. The process according to claim 22, further comprising:
(d) processing the nanocomposite obtained in step (c) at a temperature above a melt temperature of the nanocomposite.

27. The process according to claim 26, wherein step (d) comprises extruding a mixture of the polyolefin composition and the nanoparticles in an extruder.

28. The process of claim 22, wherein the blending of the nanoparticles with the polyolefin composition to obtain the nanocomposite is performed in the absence of a solvent.

29. The process according to claim 22, wherein the at least one polyolefin is prepared in the presence of a Ziegler-Natta catalyst.

30. The nanocomposite according to claim 1, wherein the at least one polyolefin is polypropylene.

31. The nanocomposite according to claim 1, wherein the at least one polyolefin is a homopolymer.

32. The nanocomposite according to claim 1, wherein the nanoparticles are selected from silicon nanoparticles or SiC nanoparticles.

* * * * *